United States Patent [19]
Whitlock et al.

[11] Patent Number: 5,446,848
[45] Date of Patent: Aug. 29, 1995

[54] ENTRY LEVEL DATA PROCESSING SYSTEM WHICH IS EXPANDABLE BY A FACTOR OF TWO TO A PARTITIONABLE UPGRADED SYSTEM WITH LOW OVERHEAD

[76] Inventors: Gary C. Whitlock, 22822 Via Octavo; Richard D. Freeman, 25742 Serenata, both of Mission Viejo, Calif. 92691; Keith S. Saldanha, 31971 Lazy Glen, Trabuco Canyon, Calif. 92679

[21] Appl. No.: 82,175

[22] Filed: Jun. 25, 1993

[51] Int. Cl.[6] .............................................. G06F 11/20
[52] U.S. Cl. .................................... 395/280; 395/800; 395/200.01
[58] Field of Search ......................... 395/325, 800, 200

[56] References Cited

U.S. PATENT DOCUMENTS

| | | | |
|---|---|---|---|
| 4,356,550 | 10/1982 | Katzman et al. | 395/575 |
| 4,449,196 | 5/1984 | Pritchard | 364/768 |
| 5,317,715 | 5/1994 | Johnson et al. | 395/425 |
| 5,333,320 | 7/1994 | Seki | 395/650 |

*Primary Examiner*—Jack B. Harvey
*Assistant Examiner*—Jeffrey K. Seto
*Attorney, Agent, or Firm*—Charles J. Fassbender; Mark T. Starr; Robert R. Axenfeld

[57] ABSTRACT

An entry level data processing system is expandable, with low overhead, by a factor of two to a partitionable upgraded data processing system. This entry level system includes: 1) one system bus, 2) a central processing module (CPM), an input/output module (IOM), and a system control module (SCM)—all of which have one system bus port coupled to the system bus, 3) a memory module coupled via a memory bus to the system control module, and 4) a system expansion interface through which the entry level system is expanded to the upgraded system. In one particular preferred embodiment, the system expansion interface consists of a) a first connector on the SCM for externally connecting to and communicating with the memory bus, b) a second connector on the SCM for externally connecting to and communicating with the system bus, and c) an extension of the system bus through a switch in the SCM and a third connector on the SCM for externally connecting to and communicating with the extended system bus. To expand the entry level system to the upgraded system, a duplicate copy of the entry level data processing system as recited in 1–4 above is added along with a respective three port bus expansion module (BEM) in each copy of the entry level data processing system. This BEM, in each particular entry level system, intercouples the first and second connectors on the SCM of that same system to the third connector on the SCM of the other entry level system.

12 Claims, 6 Drawing Sheets

ENTRY LEVEL DATA PROCESSING SYSTEM WHICH IS EXPANDABLE BY A FACTOR OF TWO TO A PARTITIONABLE UPGRADED SYSTEM WITH LOW OVERHEAD

BACKGROUND OF THE INVENTION

This invention relates to data processing systems; and more particularly, it relates to architectures for such systems which are "expandable by a factor of two", "partitionable", and "place a low overhead on the entry level system".

As used herein, a data processing system architecture is expandable by a factor of two if it includes a small or "entry level system" to which modules can be added to thereby form an "upgraded system" which has twice the processing capacity of the entry level system. Also as used herein, the upgraded system is "partitionable" when one portion of that system can be powered down for repairs while the remaining portion can continue to operate at a reduced capacity.

Now in addition to being expandable by a factor of two and being partitionable, it is highly desirable that those features be provided without greatly increasing the cost or overhead to the entry level system. Otherwise, the entry level system will be too expensive to compete with other entry level systems which third parties may offer with similar computing capacity but without the expandable and partitionable features. On the other hand, a significant marketing advantage would be obtained if an entry level system could be provided which is expandable by a factor of two to a partitionable upgraded system at essentially the same cost as an entry level system which does not have those features.

In the prior art, one entry level data processing system which is expandable by a factor of two is disclosed in U.S. patent application 08/019,003 by Tran et al and assigned to the present assignee. However, each module of the entry level system of that patent (e.g. the central processing module and memory modules) must have two system bus ports—only one of which is used in the entry level system, and the other of which is required solely for expandability. Thus, the overhead to the entry level system is 1) the second system bus, 2) the second system bus port on each module, 3) a two-to-one multiplexor which must be provided in each module to selectively transmit and receive data from the two system bus ports, and 4) control circuits which must provided in each module for the multiplexor.

Further, the above upgraded data processing system of Tran et al is not partitionable as defined above. This is because in the upgraded system, the system busses run directly to all of the modules in the system (e.g.—the two central processing modules). Thus there is no way to open circuit the system busses and power down one central processing module while the other processing module runs.

Accordingly, a primary object of the invention is to provide an entry level data processing system which is expandable by a factor of two to a partitionable upgraded system with very little overhead to the entry level system.

BRIEF SUMMARY OF THE INVENTION

In accordance with the present invention, an entry level data processing system, which is expandable by a factor of two—with low overhead—to a partitionable upgraded data processing system, has the following structure: 1) one system bus, 2) a central processing module (CPM), an input/output module (IOM), and a system control module (SCM)—all of which have one system bus port coupled to the system bus, 3) a memory module coupled via a memory bus to the system control module, and 4) a system expansion interface through which the entry level system is expanded to the upgraded system. This system expansion interface, in one particular preferred embodiment, consists of a) a first connector on the SCM for externally connecting to and communicating with the memory bus, b) a second connector on the SCM for externally connecting to and communicating with the system bus, and c) an extension of the system bus through a switch in the SCM and a third connector on the SCM for externally connecting to and communicating with the extended system bus.

To expand the entry level system to the upgraded system, a duplicate copy of the entry level data processing system as recited in 1-4 above is added along with a respective three port bus expansion module (BEM) in each copy of the entry level data processing system. This BEM, in each particular entry level system, intercouples the first and second connectors on the SCM of that same system to the third connector on the SCM of the other entry level system.

BRIEF DESCRIPTION OF THE DRAWINGS

Various preferred embodiments of the invention are described herein in conjunction with the accompanying drawings wherein.

DETAILED DESCRIPTION OF THE INVENTION

Figure 1:
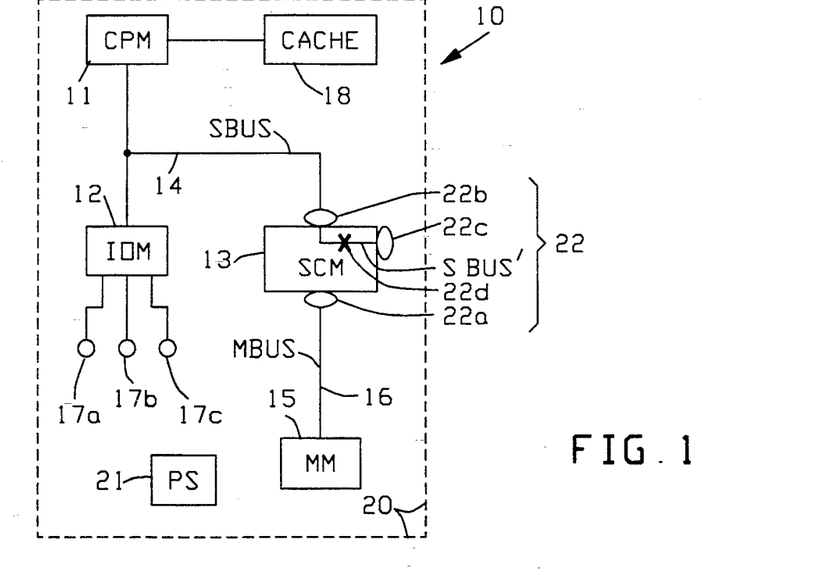
FIG. 1 shows an entry level data processing system which is structured as one preferred embodiment of the present invention.

Referring now to FIG. 1, it shows an entry level data processing system 10 which is structured as one preferred embodiment of the present invention. This entry level system 10 includes a central processing module (CPM) 11, an input/output module (IOM) 12, and a system control module (SCM) 13, all of which are intercoupled and communicate with each other over a system bus (SBUS) 14. Also included in the entry level system 10 is a memory module (MM) 15 which is coupled to the system control module 13 via a memory bus (MBUS) 16. Each of the busses 14 and 16 include an arbiter (not shown) by which their use is time shared. Also, the entry level system 10 includes several input/output devices 17 (such as a disc 17a, a keyboard 17b, and a CRT screen 17c) which are coupled to the input/output module 12, and a cache 18 which is coupled to the central processing module 11. All these components 11-18 are physically housed in a separate rack 20 where they are powered by a separate power supply 21.

In operation, the entry level system 10 processes data as follows. Initially, a software program is transferred from the disc 17a to the memory module 15 (via the components 12, 14, 13, and 16). Thereafter, portions of the program are read by the central processing module 11 from the memory module 15 and stored in the cache 18 (via components 16, 13, and 14), whereupon the program instructions in the cache are executed one at a time by the central processing module. Some instructions selectively transfer data from the disc 17a or keyboard 17b to the memory module 15 or the cache 18; other instructions specify various operations for the central processing module 11 to perform on the data in the cache 18 or the memory 15; and still other instructions send the results from the central processing module 11 to the disc 17a for storage or the CRT screen 17c for display.

Figure 2:
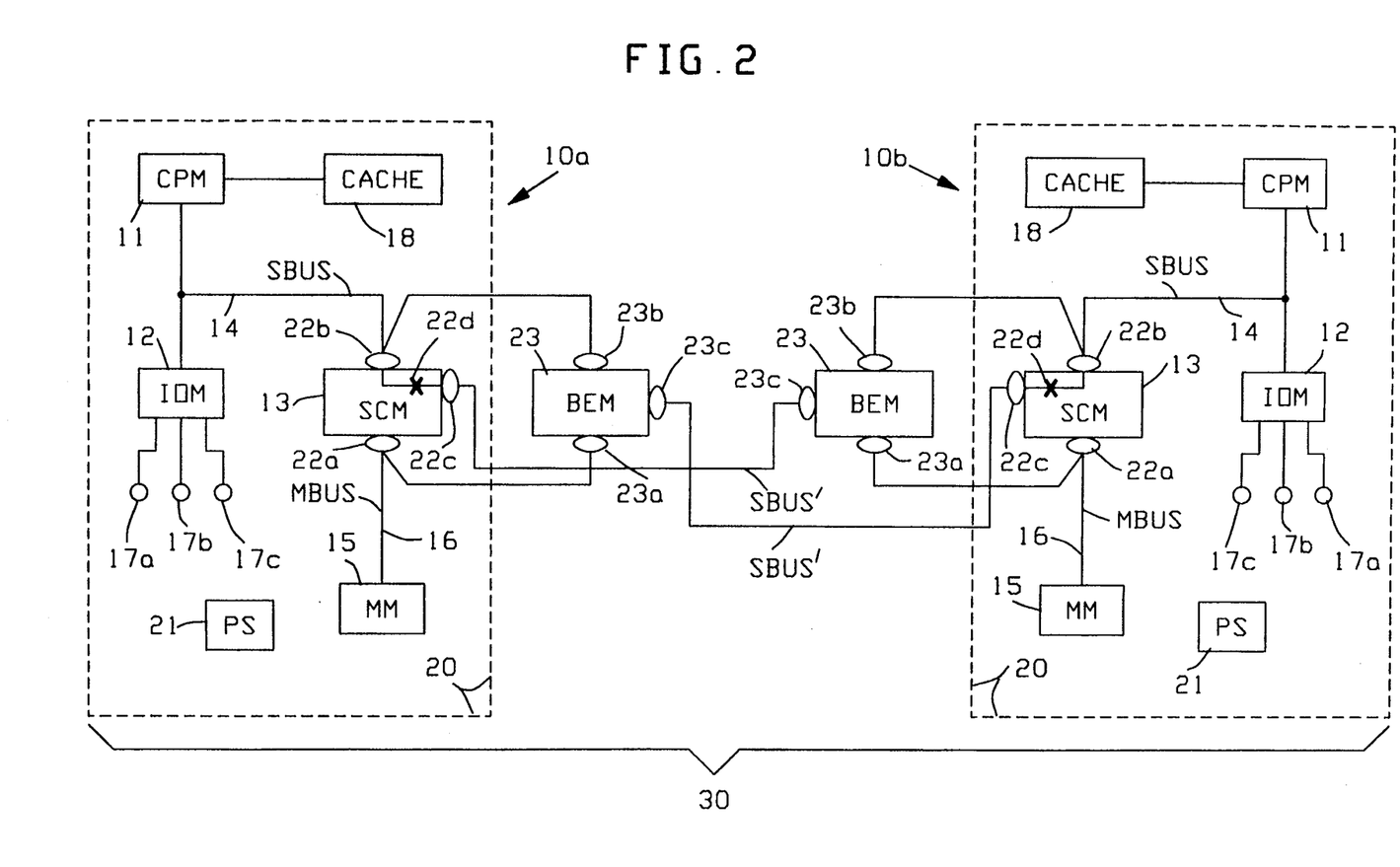
FIG. 2 shows an upgraded data processing system which has twice the processing power of the FIG. 1 entry level system and is structured by intercoupling two copies of the entry level system.

Now in accordance with one important feature of the present invention, the entry level system 10 also includes a system expansion interface 22 by which the entry level system 10 can be expanded to an upgraded data processing system 30, as shown in FIG. 2. This system expansion interface 22 includes a memory bus expansion port 22a, first and second system bus expansion ports 22b and 22c, and an extension of the system bus (SBUS') through a switch 22d on module 13. Port 22a consists of a connector for externally connecting to and communicating with the memory bus 16; port 22b consists of a connector for externally connecting to and communicating with the system bus 14; and port 22c consists of a connector for externally connecting to and communicating with that extended system bus SBUS'.

As shown in FIG. 2, the upgraded data processing system 30 of FIG. 2 includes two complete copies 10a and 10b of the entry level data processing system 10 of FIG. 1. In this upgraded system 30, the two central processing modules can receive, process, and store data without interference from the other over their own system bus and memory bus. Consequently, the upgraded system 30b has essentially twice the data processing capacity as a single entry level system 10.

In addition, in the upgraded system 30, each entry level system copy 10a and 10b has a respective three port bus expansion module (BEM) 23 through which the two entry level systems interact. On this module 23, the three ports are identified by reference numerals 23c, 23b, and 23a. Ports 23a and 23b of module 23 are connected to ports 22a and 22b of module 22 in the same entry level system, whereas port 23c of module 23 is connected to port 22c of module 22 in opposite entry level systems.

From the above it is seen that a second important feature of the present invention is that the entry level system 10 is made expandable to the upgraded system 30 while putting very little overhead into the entry level system. In particular, the overhead or added cost to the entry level system 10 which makes that system expandable is only the cost of one connector 22c plus the cost of the switch 22d. No overhead or cost in the form a second system bus and two-to-one bus multiplexor is added to CPM 11, IOM 12, or the MM 15 since they each connect to just a single system bus. Also, no overhead is added by the connectors 22a and 22b since they are used in the entry level system to connect to the SBUS and MBUS.

Also, a third important feature of the present invention is that the upgraded system 30 of FIG. 2 can be partitioned. Usually, the two entry level systems 10a and 10b interact through the ports 22a–22c and 23a–23c to read/write each others memory and to send messages to each other. However, the two entry level systems 10a and 10b can also be electrically partitioned via the SCM and BEM such that one entry level system operates on its own while the other entry level system is powered down for repairs.

Additional details on how the two entry level systems 10a and 10b interact with each as shown in FIGS. 3A–3F. Each of those figures is a duplication of FIG. 2 in which slashes (////) and X's (XXXX) have been added to highlight the various busses and ports that are utilized to perform certain operations.

Figure 3A:
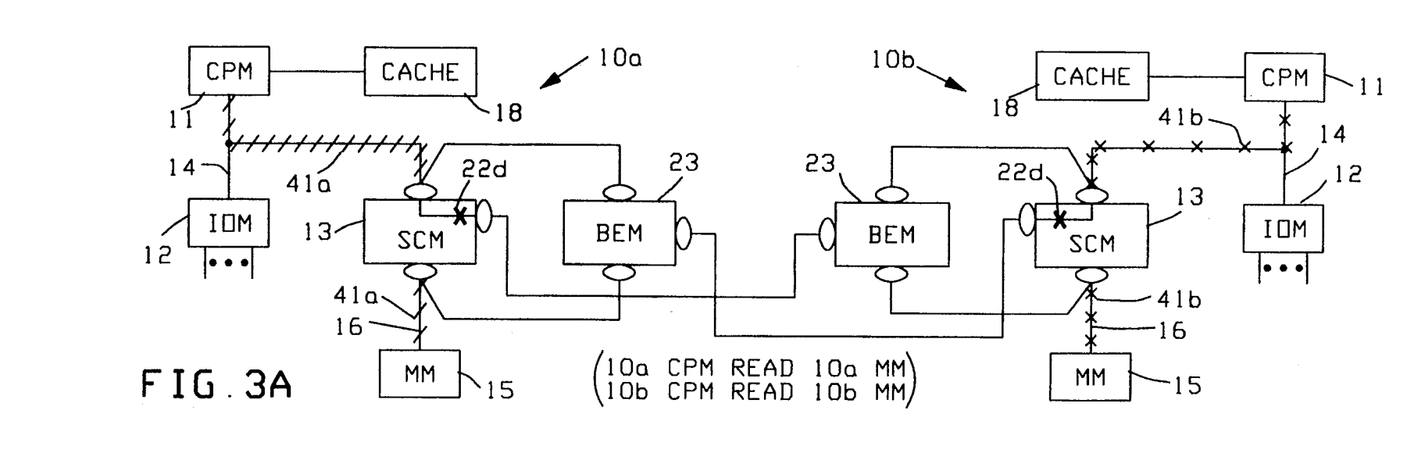
FIG. 3A shows how the two copies of the entry level systems in FIG. 2 perform memory read operations with their own respective memory module.

In FIG. 3A, the central processing module 11 in each entry level system 10a and 10b reads data from the memory module 15 which is in its own system. To do that, the central processing module 11 of system 10a uses the system bus 14 and memory bus 16 in system 10a; and the central processing module 11 of system 10b likewise uses the system bus 14 and memory bus 16 of system 10b. This is illustrated in FIG. 3A by the slashes 41a on the system bus and memory bus in system 10a, and by the X's 41b on the system bus and memory bus in system 10b.

Figure 3B:
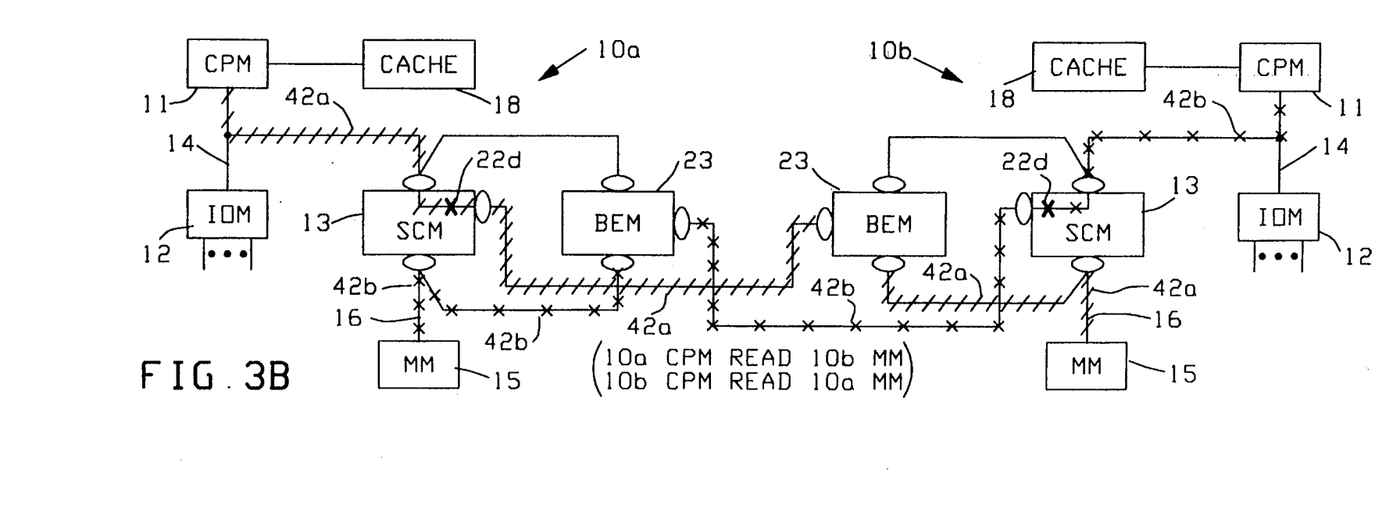
FIG. 3B shows how the two copies of the entry level systems in FIG. 2 perform memory read operations with each other's memory module.

Next, in FIG. 3B, the central processing module 11 of system 10a performs a read operation with the memory module 15 of system 10b; and at the same time, the central processing 11 of system 10b performs a read operation with the memory module 15 in system 10a. Those busses and ports which are used by the central processing module 11 of system 10a are highlighted in FIG. 3B by the slashes 42a; while those busses and ports which are used by the central processing module 11 of system 10b are highlighted by the X's 42b.

Figure 3C:
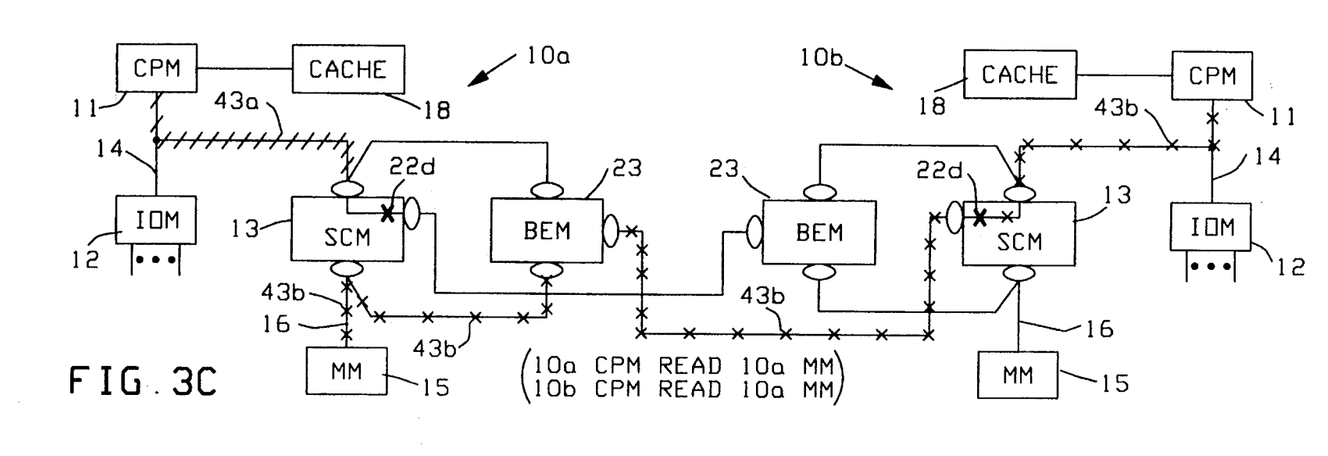
FIG. 3C shows how the two copies of the entry level systems in FIG. 2 perform memory read operations with the same memory module.

Next, in FIG. 3C; the central processing module 11 of system 10a and the central processing module 11 of system 10b both perform a read operation with the memory module 15 of system 10a. In this case, the slashes 43a highlight the busses and ports which are used by the central processing module 11 of system 10a; and the X's 43b highlight and busses and ports which are utilized by the central processing module 11 of system 10b. Note that both the slashes and the X's occur on the memory bus 16 in system 10a; and this indicates that the memory bus is time shared while the two read operations are performed.

Figure 3D:
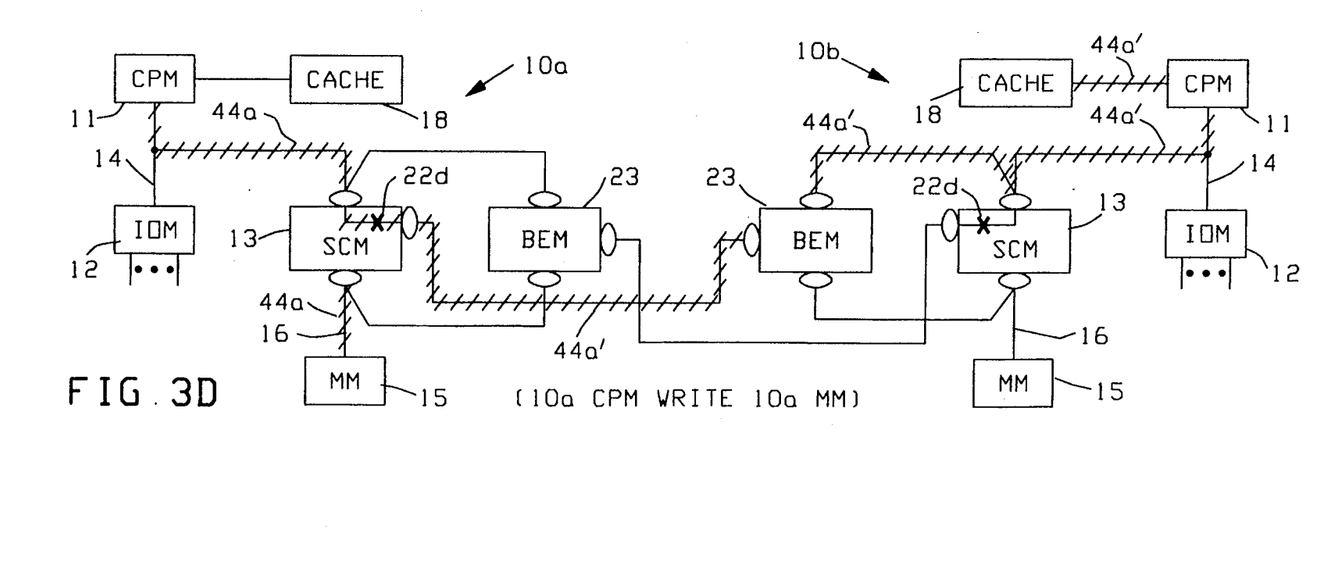
FIG. 3D shows how one copy of the entry level system in FIG. 2 performs a memory write operation with its own memory module while the other copy of the entry level system invalidates a corresponding entry in its cache.

Next, in FIG. 3D, the central processing module 11 of system 10a performs a write operation with the memory module 15 of that same system. To perform that write operation, the busses and ports as highlighted by slashes 44a are used. In addition, while the write operation is being performed, the busses and ports as highlighted by the slashes 44a' are used to spy on the write and invalidate any entry in the cache 18 of system 10b which corresponds to an entry in the memory module 15 of system 10a that is being written. For example, if the entry at address 12345 is being written in the memory 15 of system 10a, then a message is sent via the busses and ports 44a' to the cache 18 of system 10b advising that the cache entry having address 12345 should be invalidated.

Figure 3E:
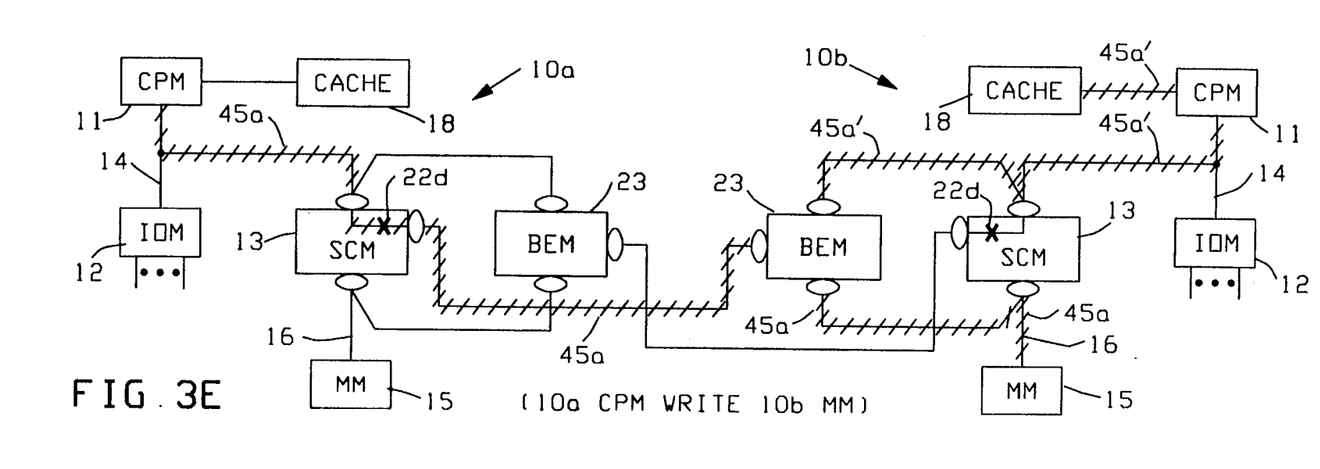
FIG. 3E shows how one copy of the entry level system in FIG. 2 performs a memory write operation with the memory module of the other entry level system, while that other system invalidates a corresponding entry in its cache.

Similarly, in FIG. 3E, the central processing module 11 of system 10a performs a write operation on the memory module 15 of system 10b. That write operation is performed by utilizing the busses and ports which are highlighted by the slashes 45a. In addition however, while that write operation is being performed, the busses and ports as highlighted by the slashes 45a' are used to spy on the write and advise the cache 18 of system 10b to invalidate any cache entry which corresponds to the entry in memory module 15 that is being written.

Note that for each of the write operations that are illustrated in FIGS. 3D and 3E, another similar operation also exists wherein the central processing module of system 10b initiates the memory write. These similar operations are illustrated by simply transposing all of the slashes in the left half of FIGS. 3D and 3E to the right half of those figures; and vice versa.

Also in FIGS. 3D and 3E, each of the write operations which are there illustrated as being initiated by the central processing module 11 can also be initiated by the input/output module 12. To illustrate those cases, the slashes 44a and 45a on the system bus 14 simply come from the input/output module 12 rather than the central processing module 11; and all remaining portions of the FIGS. 3D and 3E stay the same.

Figure 3F:
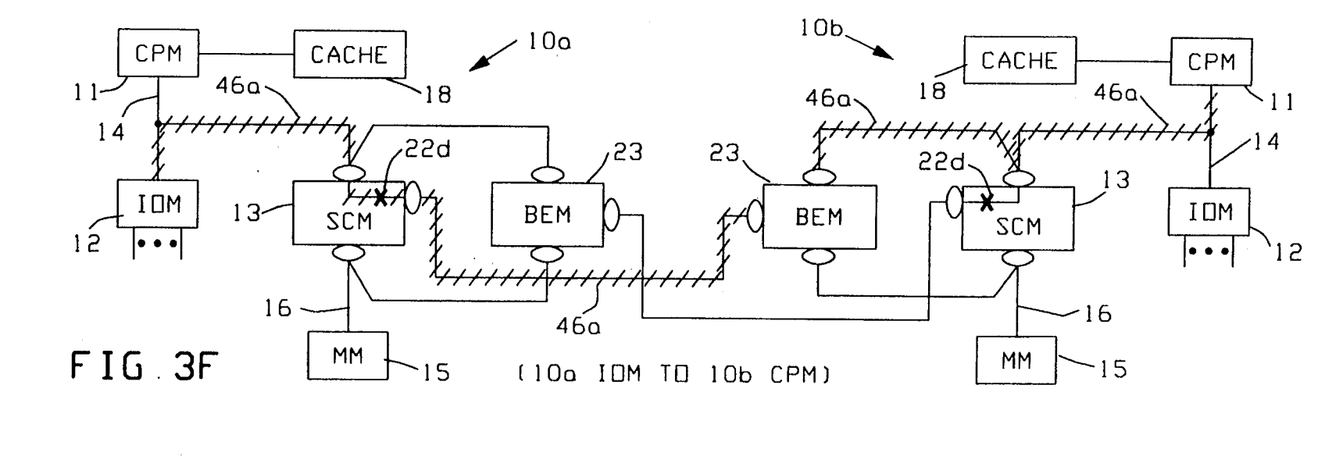
FIG. 3F shows how an input/output module in one entry level system in FIG. 2 sends a message to a central processing module in the other entry level system.

Lastly, in FIG. 3F, an operation is illustrated wherein the input/output module 12 of system 10a sends a message to the central processing module 11 of system 10b. In that case, the busses and ports which are utilized are highlighted by the slashes 46a. Such a message transfer could, for example, be initiated by an operator via the keyboard 17b. Similarly, the central processing module 11 of system 10a can send a message to the central processing module 11 of system 10b. Likewise, each input/output module 12 can sent a message to the central processing module of its own system; and vice versa.

Figure 4:
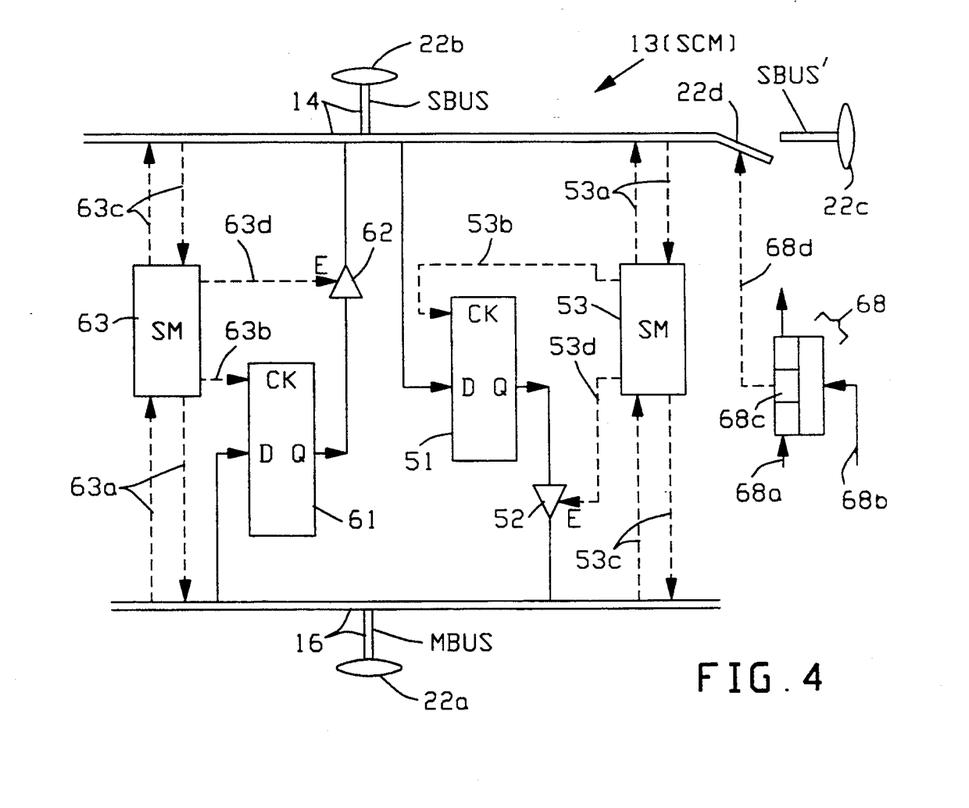
FIG. 4 shows the internal makeup of a system control module which is included within the entry level systems of FIGS. 1 and 2; and, FIG. 5 shows the internal makeup of a bus expansion module which is included within the upgraded data processing system of FIG. 2.

Turning now to FIG. 4, a preferred embodiment of the internal structure for the system control module 13 will be described. In FIG. 4, the three ports of the system control module 13 are again identified by reference numerals 22a, 22b, and 22c; the switch to port 22c is again identified by reference numeral 22d; the system bus is again identified as SBUS and item 14; the memory bus is again identified as MBUS and item 16; and the extended system bus is again identified as SBUS'.

Now in order to store memory commands from the system bus 14 and pass those commands to the memory bus 16, the system control module 13 internally includes a register 51, a bus transmitter 52, and a state machine 53. Register 51 has a data input. D which receives one complete memory command from the system bus 14. This includes an operation code such as a read code or a write code, a memory address, a word of data to be written in the case of a write code, and a source code which identifies the module that sent the memory command. Register 51 also has an output Q which is coupled to an input of the transmitter 52; and the transmitter has an output which is coupled to the memory bus 16.

In operation, the state machine 53 receives and sends control signals on the system bus via a set of conductors 53a. By those signals, the state machine 53 determines when the system bus 14 is carrying a memory command for the memory module 15 on its memory port 22a. When that occurs, the state machine 53 generates a clock signal on a conductor 53a which goes to the clock input CK of register 51; and in response, the memory command on the system bus 14 is loaded into register 51. Thereafter, the state machine 53 bids for and obtains the use of the memory bus 16 by sending and receiving control signals over a set of conductors 53c to the memory bus. When the memory bus is obtained, the state machine 53 sends an enable signal on a conductor 53d which goes to an enable input E of the transmitter 52, and that causes the memory command in register 51 to be transmitted onto the memory bus 16.

Similarly, to store the results of a memory operation (e.g. read data) from the memory bus 16 and transfer those results to the system bus 14, the system control module 13 internally includes a register 61, a bus transmitter 62, and a state machine 63. Register 61 has a data input D which is coupled to receive the results of the memory operation from the memory bus 16. Register 61 also has an output Q which is coupled to an input of the bus transmitter 62, and an output of that transmitter is coupled to the system bus 14.

In operation, the state machine 63 receives and sends control signals on the memory bus 16 via a set of conductors 63a to determine when the results of the memory operation on that bus need to be transferred to the system bus 14. When such a transfer is needed, the state machine 63 generates a clock signal on a conductor 63b which is sent to the clock input CK of register 61; and in response, the results of the memory operation are loaded from the memory bus 16 into register 61. Thereafter, the state machine 63, transmits and receives control signals on the system bus 14 via a set of conductors 63c to thereby obtain the use of that bus. Then, when the system bus 14 is obtained, the state machine 63 generates an enable signal on a conductor 63d which is sent to an enable input E on the transmitter 62, and that causes the content of register 61 to be transmitted onto the system bus.

Also included in the system control module 13 is a serial shift register 68. This register has a data input 68a and a clock input 68b on which signals are sent by an operator of the previously described keyboard 17b of FIG. 2. In operation, when it is desired to have the two entry level systems 10a and 10b of FIG. 2 interact with each other as one upgraded system 30, a CONNECT command is sent via the keyboard which causes a "1" bit to be shifted into a stage 68c of register 68. That "1" bit is then sent via a conductor 68d to the switch 22d which, in response, closes. Conversely, when it is desired to electrically partition the two entry level systems 10a and 10b from each other, then a "0" is sent via the keyboard to the shift register stage 68c, and that causes the switch 22d to open.

Figure 5:
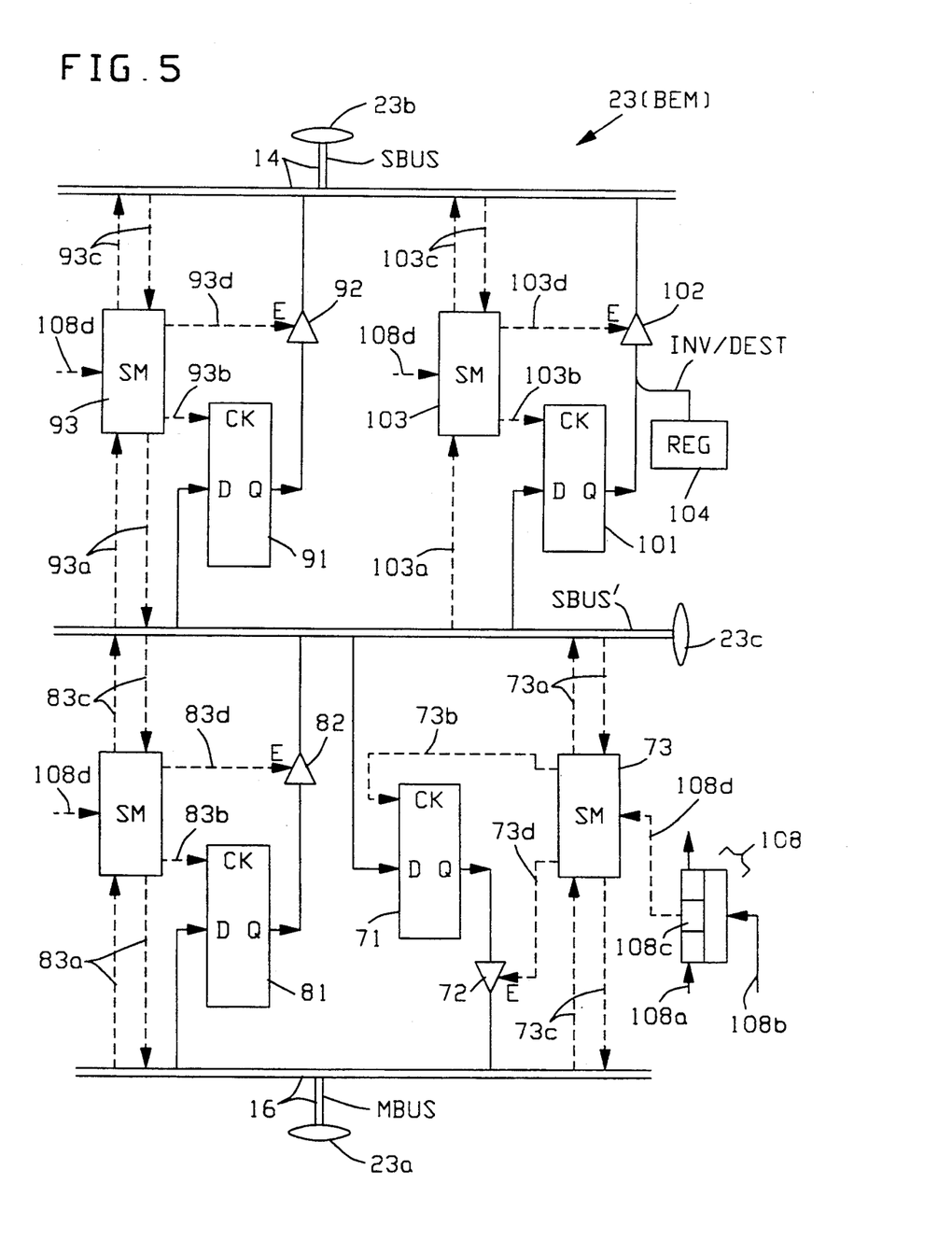

Next, referring to FIG. 5, a preferred embodiment of the internal structure for the bus expansion module 23 will be described. In FIG. 5, the three ports of module 23 are again identified by reference numerals 23a, 23b, and 23c. In order to store memory commands on the extended system bus SBUS' and pass them to the memory bus 16, module 23 includes a register 71, a bus transmitter 72, and a state machine 73. Register 71 has a data input D which is coupled to the extended system bus SBUS' such that it receives one complete memory command from that bus. Register 71 also has an output Q which is coupled to an input of the bus transmitter 72, and an output of that transmitter is coupled to the memory bus 16.

In operation, the components 71, 72, and 73 behave exactly like the previously described components 51, 52, and 53 of the system control module 13. In particular, the state machine 73 initially determines when the system bus SBUS' is carrying a memory command for the memory module on port 23a by receiving and sending control signals on the extended system bus SBUS' via a set of conductors 73a. When such memory command is detected on the extended system bus SBUS', the state machine 73 generates a clock signal on a conductor 73b which causes that memory command to be stored in the register 71. Thereafter, the state machine 73 obtains the use of the memory bus on port 23a by sending and receiving control signals on that bus via a set of conductors 73c. When that memory bus is obtained, the state machine 73 generates an enable signal on a conductor 73d which causes the memory command in register 71 to be transferred through the transmitter 72 to the memory bus 16.

Also, in order to transfer the results of the memory operation from the memory bus 16 to the extended system bus SBUS', the bus expansion module 23 further includes a register 81, a bus transmitter 82, and a state machine 83. Register 81 has a data input D which is coupled to the memory bus 16 such that it receives the results of the memory operation from the bus. Register 81 also has an output Q which is coupled to an input of the transmitter 82, and that transmitter has an output coupled to the extended system bus SBUS'.

In operation, the components 81, 82, and 83 behave the same as the previously described components 61, 62 and 63 in the system control module 13 of FIG. 4. In particular, in order to detect when the results of a memory operation on the memory bus 16 need to be transferred to the extended system bus SBUS', the state machine 83 receives and transmits control signals via a set of conductors 83a on the memory bus 16. Then, when it is determined that such memory results need to be transferred, the state machine 83 generates a clock signal on a conductor 83b which causes those results to be stored in the register 81. Thereafter, the state machine 83 requests and obtains the use of the extended system bus SBUS' by transmitting and receiving control signals via a set of conductors 83c on that bus. Then, when the extended system bus SBUS' is obtained, the state machine 83 generates an enable signal on a conductor 83d which causes the content of register 81 to be transferred through the transmitter 82 onto the extended system bus.

Further, in order to transfer non-memory messages from the extended system bus SBUS' to the system bus SBUS, the bus expansion module 23 includes a register 91, a bus transmitter 92, and a state machine 93. These non-memory messages include, for example, any message from an input/output module 12 of the entry level system 10a to a central processing module of the other entry level system 10b as previously described in conjunction with FIG. 3F. Likewise, these non-memory messages include any message from the central processing module of one entry level system to the central processing module of another entry level system.

To receive the non-memory messages from the extended system bus SBUS', register 91 has a data input D which is coupled to that bus; and to transfer those messages to the system bus SBUS, register 91 has an output Q which is coupled to the input of the transmitter 92 which in turn has an output coupled to the system bus. In operation, the occurrence of a non-memory message on the extended system bus SBUS' which needs to be transferred to the system bus SBUS is detected in the state machine 93 by receiving and sending control signals via a set of conductors 93a on the extended system bus. When such detection occurs, the non memory message on the extended system bus SBUS' is stored in register 91 in response to a clock signal which is generated by the state machine 93 on a conductor 93b. Thereafter, the state machine 93 obtains the use of the system bus 14 by transmitting and receiving various control signals on that bus via a set of conductors 93c. Then, when the system bus is obtained, the state machine 93 transfers the non-memory message from register 91 through the transmitter 92 to the system bus by sending an enable signal on a conductor 93d to the transmitter 92.

Further, to perform an interbus spy operation, the bus expansion module 23 includes a register 101, a bus transmitter 102, a state machine 103, and a register 104. This interbus spy operation is the operation that was previously described in conjunction with FIGS. 3D and 3E; and the bus transfers which are highlighted in those figures by the slashes 44a' and 45a' are implemented by the above identified components 101–104.

In operation, the state machine 103 monitors control signals on the extended system bus SBUS' via a set of conductors 103a to thereby determine when that bus carries a memory write command for the memory module 15 in either one of the entry level systems 10a or 10b. When such a command is detected, the state machine 103 sends a clock signal on a conductor 103b to the register 101; and in response, that register stores the memory address for the write command from the extended system bus SBUS'. Thereafter, the state machine 103 sends and receives control signals over a set of conductors 103c to the system bus SBUS in order to obtain the use of that bus. Then, when the system bus is obtained, the state machine 103 sends an enable signal on a conductor 103d to the bus transmitter 102; and in response, the content of the two registers 101 and 104 are transmitted to the system bus.

Register 104 is preloaded with an instruction code INV which indicates that any entry in a cache having a memory address as provided by register 101 should be invalidated. Register 104 is also preloaded with a destination DEST which identifies all of the modules on the system bus that have cache and are to execute the INV instructions. In the FIG. 1 embodiment of the entry level system 10a, only the central processing module 11 included a cache; but as a modification, the input/output module 12 can also include a cache. In that case, the destination DEST in register 104 would identify both of the modules 11 and 12, and only a single invalidation message would be sent on the system bus.

Lastly, in the bus expansion module 23, there is a shift register 108 which is similar in structure and operation to the previously described shift register 68 in the system control module 13. In particular, register 108 has a data input 108a and a clock input 108b; and by these inputs, control information is transferred from the keyboard 17b into the shift register. That register 108 also has a stage 108c whose output is sent via a conductor 108d to each of the state machines in module 23. When the output signal on conductor 108d carries a "1" bit, all of the state machines in module 23 operate as described above; whereas when conductor 108d carries a "0" bit, none of those state machines send any signals to the busses to which they are coupled.

A preferred embodiment of the invention has now been described in detail. In addition however, various changes and modifications can be made to those details without departing from the nature and spirit of the invention.

For example, to implement the central processing module 11, any type of microprocessor chip can be used. These include the Intel 80286/80386/80486 microprocessor chips and the Motorola 68020/68040 microprocessor chips. Similarly, to implement the system busses SBUS and SBUS' and to implement the memory bus MBUS, many types of bus structures and bus protocols can be used. It is only necessary for those busses to be able to carry memory and non-memory messages between the modules in a time-shared fashion.

As another variation, the switch 22d in the system control module 13 can be either an all electronic switch or an electromechanical switch. In one preferred embodiment, switch 22d consists of a set of field effect transistors. These transistors have their sources and drains connected in parallel between the system bus and the extended system bus such that each transistor passes one particular signal between the two busses; and these transistors have their gate connected to receive the control signal from conductor 68d. Alternatively, the switch 22d can consist of a set of relays which are connected in parallel between the two busses SBUS and SBUS', and which open and close in response to the control signal on conductor 68d. With each of these embodiments, an important feature is that when the switch 22d is closed, essentially no delay is added to the signals which pass through the switch between the busses SBUS and SBUS'.

Also, as still another variation, the MBUS and SBUS and SBUS' connections between the modules of FIGS. 1 and 2 can be implemented more than one way. In one preferred embodiment, the MBUS, SBUS, and SBUS' interconnections which are shown in FIGS. 1 and 2 are made by three separate cables. The SBUS cable plugs into ports 22b and 23b as well as into respective connectors (not shown) on the CPM and IOM; the MBUS cable plugs into ports 22a and 23a, as well as a connector (not shown) on the MM; and the SBUS' cable plugs into ports 22c and 23c.

In another embodiment, all of the interconnections that are shown in FIG. 2 between the MBUS and SBUS are made by conductors on a backplane. That backplane is held by a frame which also holds the BEM and SCM modules of FIG. 2. In this embodiment, only the SBUS' interconnections to the BEM modules are made via cables.

Further, as yet another variation, each of the modules CPM with cache, IOM, SCM, MM, and BEM is made of application specific integrated circuits (ASIC's) that are mounted on a separate printed circuit board. Alternatively, however, each of those modules is made of custom integrated circuits that are mounted on a separate multi-chip ceramic substrate.

Accordingly, it is to be understood that the invention is not limited to the details of the preferred embodiments but are defined by the appended claims.

What is claimed is:

1. An upgraded data processing system which is comprised of two intercoupled entry level data processing systems; each entry level data processing system including:
   a system bus;
   a central processing module, an input/output module, and a system control module; all of which are coupled to said system bus;
   a memory module coupled via a memory bus to said system control module;
   a system expansion interface comprising—a) a memory bus expansion port for externally communicating with said memory bus, b) a first system bus expansion port for externally communicating with said system bus, and c) an extension of said system bus through a switch on said system control module to a second system bus expansion port for externally communicating therewith;
   a three port bus expansion module which intercouples said first system bus expansion port and memory bus expansion port of one entry level data processing system to said second system bus expansion port of the other entry level data processing system;
   said three port bus expansion module having a partition control circuit with an input for receiving a partition command, and which in response to said partition command inhibits all transmissions from said bus expansion module to said first system bus expansion port and said memory bus expansion port; and,
   said system control module having a partition control circuit with an input which also receives said partition command, and which in response thereto opens said switch in the system control module.

2. The invention of claim 1 wherein each entry level data processing system has a separate power supply, and wherein after said partition command is received, one entry level data processing system receives no power while the other entry level data processing system receives power and is operable.

3. The invention of claim 1 wherein in each entry level data processing system, said switch is comprised of multiple field effect transistors, each of which passes a respective signal on said system bus.

4. The invention of claim 1 wherein in each entry level data processing system, said switch is comprised of multiple electro mechanical relays, each of which passes a respective signal on said system bus.

5. The invention of claim 1 wherein in each entry level data processing system, said bus expansion module includes an interbus spy circuit which senses a memory write command on said second system bus expansion port, and in response, sends an invalidate command from said first system bus expansion port.

6. The invention of claim 1 wherein in each entry level data processing system, said interbus spy circuit is comprised of a command decoder which generates a hit signal when a memory write command occurs on said second system bus expansion port, a register which stores a memory address on said second system bus expansion port in response to said hit signal, and a state machine which in response to said hit signal transmits said stored memory address and said invalidate command to said first system bus expansion port.

7. The invention of claim 1 wherein in each entry level data processing system, said central processing module and said input/output module both include a memory cache, and wherein said interbus spy circuit sends said invalidate command to both of said caches simultaneously.

8. An upgraded data processing system which is comprised of two intercoupled entry level data processing systems; each entry level data processing system including:
- a system bus;
- a central processing module, an input/output module, and a system control module; all of which are coupled to said system bus;
- a memory module coupled via a memory bus to said system control module;
- a system expansion interface comprising—a) a memory bus expansion port for externally communicating with said memory bus, b) a first system bus expansion port for externally communicating with said system bus, and c) an extension of said system bus through a switch on said system control module to a second system bus expansion port for externally communicating therewith;
- a three port bus expansion module which intercouples said first system bus expansion port and memory bus expansion port of one entry level data processing system to said second system bus expansion port of the other entry level data processing system; and,
- all intercoupling in said system bus expansion module being monodirectional from said second system bus expansion port to said first system bus expansion port, and being bidirectional between said second system bus expansion port and said memory bus expansion port.

9. The invention of claim 8 wherein in each entry level data processing system:
- said three port bus expansion module includes a partition control circuit having an input for receiving a command, and which in response to said command inhibits all transmissions from said bus expansion module to said first system bus expansion port and said memory bus expansion port; and,
- said system control module includes a partition control circuit having an input which also receives said command, and which in response thereto opens said switch in the system control module.

10. The invention of claim 8 wherein in each entry level data processing system, said bus expansion module includes an interbus spy circuit which senses a memory write command on said second system bus expansion port, and in response, sends an invalidate command from said first system bus expansion port.

11. The invention of claim 8 wherein in each entry level data processing system, each port in said system expansion interface consists essentially of a respective electro-mechanical connector.

12. The invention of claim 8 wherein in each entry level data processing system, said central processing module, input/output module, and system control module are connected directly to said system bus with no two-to-one multiplexor disposed there between, and said memory module is connected directly to said memory bus with no two-to-one multiplexor disposed there between.

* * * * *

UNITED STATES PATENT AND TRADEMARK OFFICE
CERTIFICATE OF CORRECTION

PATENT NO. : 5,446,848
DATED : August 29, 1995
INVENTOR(S) : Gary C. Whitlock, et al It is certified that error appears in the above-indentified patent and that said Letters Patent is hereby corrected as shown below:

On the title page: Item [73] Assignee should read --Unisys Corporation of Blue Bell, Pennsylvania --.

Signed and Sealed this

Tenth Day of September, 1996

Attest:

BRUCE LEHMAN

Attesting Officer

Commissioner of Patents and Trademarks